Sept. 8, 1964 G. H. SMITH 3,147,690
ROTISSERIE NET TIGHTENER
Filed June 14, 1961 2 Sheets-Sheet 1

INVENTOR.
GEORGE H. SMITH
BY *Elliott & Pastoriza*
ATTORNEYS

Sept. 8, 1964  G. H. SMITH  3,147,690
ROTISSERIE NET TIGHTENER
Filed June 14, 1961  2 Sheets-Sheet 2

INVENTOR.
GEORGE H. SMITH
BY *Elliott & Pastoriza*
ATTORNEYS

United States Patent Office
3,147,690
Patented Sept. 8, 1964

3,147,690
ROTISSERIE NET TIGHTENER
George H. Smith, 22632 Hamlin St., Canoga Park, Calif.
Filed June 14, 1961, Ser. No. 117,098
3 Claims. (Cl. 99—421)

The invention relates to a novel tightening means for use with a chain net structure employed to surround and support food to be barbecued.

In my co-pending patent application Serial No. 53,249, filed August 31, 1960, and entitled "Rotisserie Cooking Net," there is disclosed a chain net structure for supporting fowl or other food to be barbecued. The net is constructed such that pulling on opposite ends will tend to circumferentially collapse the net to cause a tight binding on the various net portions to the particular food to be cooked. The flexibility of the chain net itself enables it to conform generally to the shape of the food.

As the food supported within the net cooks, shrinkage sometimes results so that portions of the net may become loose and the entire net structure tend to droop and thus result in the fowl or other product being cooked falling closer to the bed of coals. This problem can be overcome very easily by pulling on one end of the net, thus tightening the net both longitudinally and circumferentially. This action, however, necessitates loosening one of the end clamps employed for holding the net and then physically moving the clamp along a portion of the rotating spit shaft.

With the above in mind, it is a primary object of this invention to provide a novel tightening means which greatly facilitates tightening of a rotisserie chain net during barbecuing.

Another object is to provide a rotisserie net tightener for use with rotary driven spits in which the rotation of the spit itself can be employed advantageously to effect the desired tightening so that supervision is unnecessary.

Briefly, these and other objects and advantages of this invention are attained by providing an externally threaded sleeve arranged to be secured for rotation with the spit structure adjacent one end of the spit structure. This sleeve includes a nut structure threaded thereto such that rotation of the nut structure will cause the nut structure to move longitudinally along the sleeve. Since the sleeve is secured for rotation with the spit structure, simply holding the nut structure stationary will cause a threading thereof to effect the desired relative longitudinal movement between the nut structure and the sleeve.

A hook member is received over the threaded sleeve and arranged to be secured to one end of the nut structure. A coupling means in turn is disposed between the nut structure and hook member to cause longitudinal movement of the hook member with the nut structure and yet permit relative rotation between the hook member and nut structure.

In a simplified embodiment of the invention, the nut structure includes radially extending handles which may be held stationary by an operator, thereby holding the nut stationary and permitting the threaded sleeve to rotate within the nut and thus cause longitudinal movement of the nut and hook member to effect the desired tightening. In a more sophisticated embodiment of the invention, there are provided means cooperating with the nut structure for automatically effecting a rotation of the nut structure relative to the threaded sleeve in response to rotation of the spit itself all in an entirely automatic manner so that no supervision of the tightening process by the operator is necessary.

A better understanding of the net tightener will be had by now referring to preferred embodiments thereof as illustrated in the accompanying drawings, in which.

Figure 1:
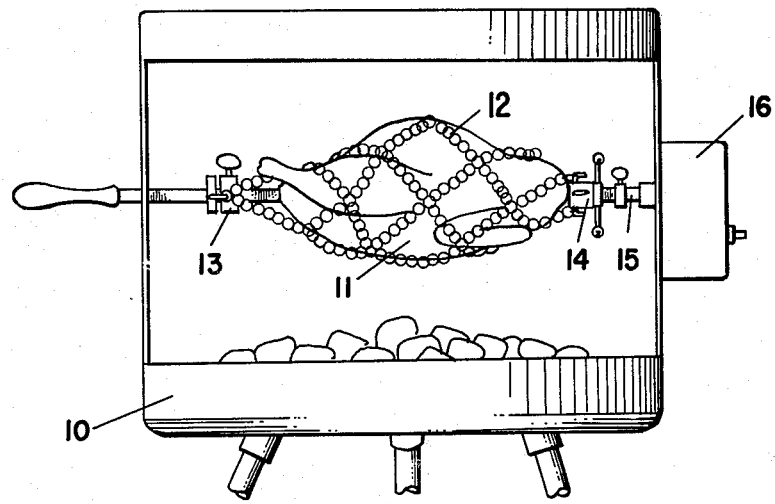
FIGURE 1 is a front elevational view illustrating a rotisserie employing a chain net in which the tightener of the present invention may be advantageously used.

Referring first to FIGURE 1, there is shown a barbecue 10 including a bed of hot coals for barbecuing food such as fowl 11 securely bound within a rotisserie chain net 12 of the type disclosed in my above referred to copending patent application.

As shown, the left end of chain 12 is tightly held in a clamp 13. The right end is secured to the rotisserie net tightener 14 of this invention; the tightener structure itself being secured to a portion of the rotating spit shaft 15. The spit shaft is coupled for rotation by a motor 16 in a conventional manner.

Figure 2:
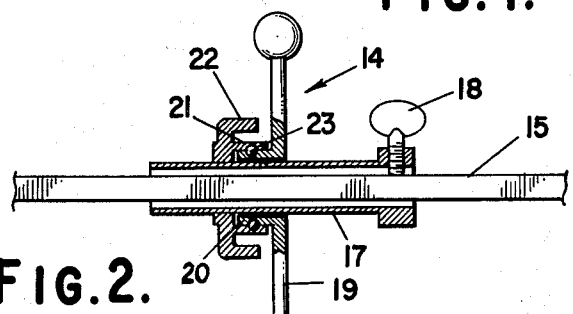
FIGURE 2 is an enlarged cross-sectional view of a first embodiment of the tightener.

With particular reference to FIGURE 2, it will be noted that the tightener includes a threaded sleeve 17 secured to the spit shaft 15 for rotation therewith as by a simple thumb-operated lock screw 18. A nut structure including radially extending arms such as indicated at 19 and a central internally threaded cylindrical portion 20 is threaded to the sleeve 17 such that rotation of the radial arm 19 will cause longitudinal movement of the nut structure along the sleeve.

The assembly is completed by a hook member including a cylindrical portion 21 and hook elements 22 for securement to one end portion of the rotisserie chain net of FIGURE 1. The cylindrical portion 21 of the hook member surrounds the shaft 17 as shown and telescopes in overlapping relationship with the cylindrical portion 20 of the nut structure. Suitable coupling means in the form of ball bearings 23 are provided to couple the hook member to the nut structure such that the hook member will be locked for longitudinal movement with the nut structure but free to rotate relative to the nut structure.

Figure 3:
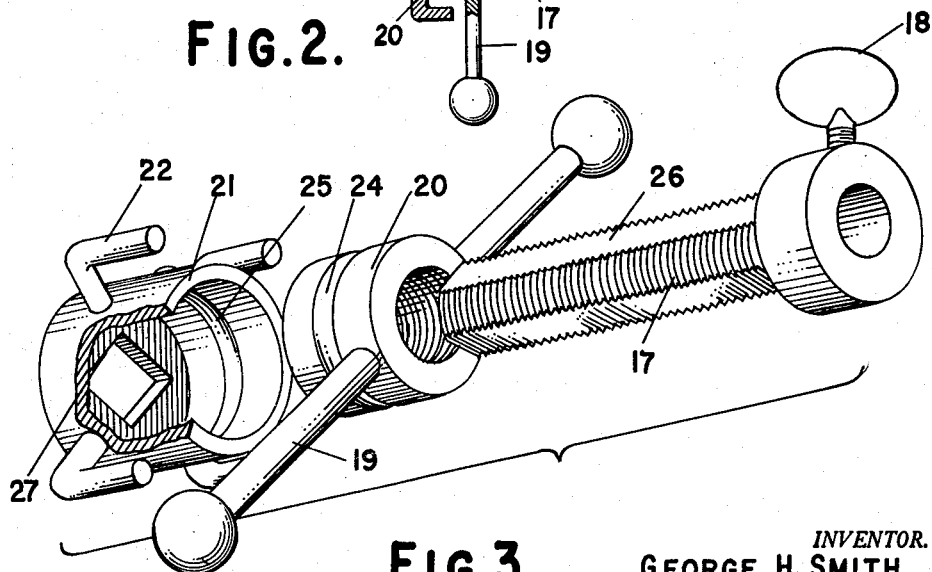
FIGURE 3 is a further enlarged exploded view showing the basic elements of the tightener.

This coupling means will become more evident by reference to the exploded view of FIGURE 3 wherein it will be noted that the cylindrical portion 20 of the nut structure includes an external annular groove 24 and the cylindrical portion 21 of the hook member includes an internal annular groove 25 in juxtaposition to the annular groove 24 when the cylindrical portions are in telescoped relationship. Each bearing 23 is partially received within each of these opposed annular grooves so that the members are locked against relative longitudinal movement but one member may rotate relative to the other.

As also evident from FIGURE 3, the hook member is locked against relative rotation with respect to the sleeve 17 by providing at least one longitudinal flat surface portion 26 on the sleeve 17 and a cooperating flat portion 27 in the central opening of the hook member receiving the sleeve. Any other suitable keying means may be employed to enable relative longitudinal movement between the hook member and sleeve 17 to take place while preventing relative rotational movement therebetween.

In operation, it will be evident that as the spit shaft 15 rotates, the hook member will be caused to rotate because of the square opening having the flat portion 27 cause of the square opening having the flat portion 27 engaging the flat surface 26 of the sleeve 17 and because of the securement of the sleeve 17 to the shaft 15 by the lock screw 18. The nut structure will also rotate with the entire assembly because of friction between the threaded portion of the sleeve 17 and internal threads of the cylindrical portion 20 of the nut structure. If it is desired to effect a tightening of the nut, the arms such as the arm 19 of the nut structure is held stationary, thereby permitting the sleeve 17 to rotate within the nut structure. This action will result in the nut structure being threaded to the right along the sleeve 17 and, through the medium of the bearings 23 as illustrated in FIGURE 2, pulling the hook member also to the right. This action will then effect the desired pulling or tightening action on the chain net 12.

Figure 5:
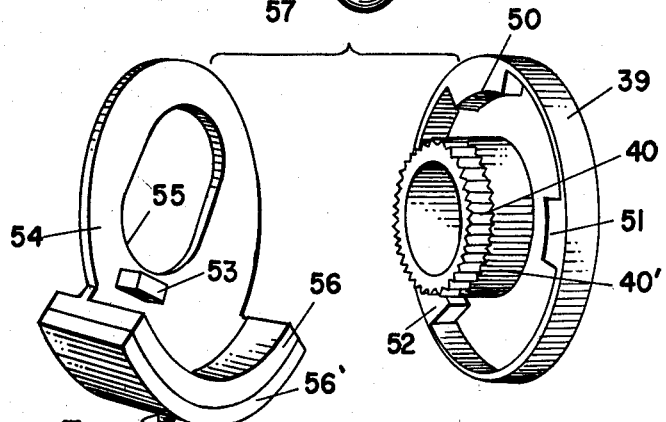
FIGURE 5 is an enlarged exploded perspective view of two of the basic components of the tightener of FIGURE 4.
Figure 6:
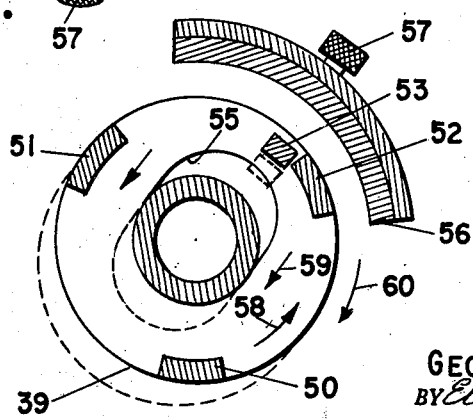
FIGURE 6 is a diagrammatic cross section of the elements shown in FIGURE 5 in assembled relationship useful in explaining the operation of the embodiment of FIGURE 4.

In order to avoid the necessity of an operator periodically holding the arm 19, a completely automatic operating means may be provided. One such means which is operated automatically in response to rotation of the spit structure is illustrated in FIGURES 4, 5, and 6.

Figure 4:
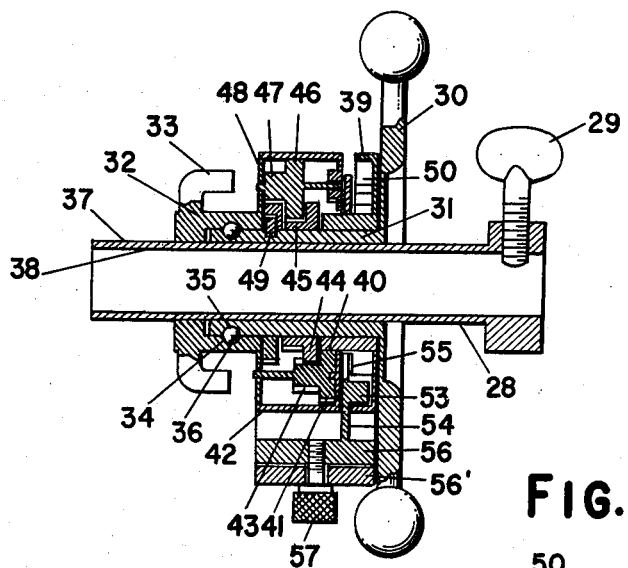
FIGURE 4 is a cross-sectional view illustrating a second embodiment of the tightener of the invention.

With reference first to FIGURE 4, the structure includes the basic components of a threaded sleeve, nut structure, and hook member similar to the corresponding components described in conjunction with FIGURES 2 and 3. Thus, there is shown an externally threaded sleeve 28 arranged to be secured for rotation with a spit shaft (not shown) by a thumb operated set screw 29. The nut structure includes a radial handle such as indicated at 30 and a cylindrical internally threaded portion 31 of somewhat greater longitudinal extent than the portion 20 of the nut structure shown in FIGURES 2 and 3. A hook member 32 including hook elements 33 telescopes over the nut structure portion 31 and there is provided a bearing means 34 fitted within opposed grooves 35 and 36 for locking the hook member 32 to the nut structure 31 for longitudinal movement therewith and yet permitting relative rotational movement therebetween. A portion of the sleeve 28 is provided with a flattened surface such as 37 for cooperation with a corresponding flattened surface portion 38 in the opening of the hook member 32. Thusfar, as noted above, the structure described is the same as that shown for the simplified version of the tightener described in FIGURES 2 and 3.

The remaining structure illustrated in FIGURE 4 constitutes an actuating means which is responsive to rotation of the spit and sleeve 28 to effect a relative rotation of the nut structure with respect to the sleeve to provide the desired tightening. This actuating means takes the form of an anvil housing 39 including a driving gear means constituting a main driving gear 40 at the end of a cylindrical portion defining a journal 40'. The driving gear 40 is coupled to a first reduction gear 41 rotatably mounted to a reduction gear housing 42. The first reduction gear 41 includes a second reduction gear 43 coaxial and rotatable therewith, the second reduction gear 43 being in engagement with a third reduction gear 44 surrounding the sleeve 28. The third reduction gear 44 constitutes a second compound gear including a fourth reduction gear 45 co-axial and rotatable with the gear 44. The gear 45 is engaged with a fifth reduction gear 46 having a sixth reduction gear 47, co-axial and rotatable therewith. The sixth reduction gear 47 is in engagement with a spindle gear 48 keyed as by a key 49 to the nut structure 31.

With the foregoing arrangement, a very high degree of gear reduction is effected so that rotation of the anvil housing 39 through a given arc will effect a very slight rotation of the nut structure 31 through the gear train.

As shown most clearly with reference to FIGURE 5, the anvil housing 39 includes radially spaced anvil elements 50, 51, and 52. These three elements are circumferentially spaced at one hundred twenty degrees, Cooperating with this structure is a hammer means including a hammer element 53 similarly radially spaced and secured to a hammer frame structure 54 having a central oblong opening 55 arranged to encircle the journal portion 40' when in assembled relationship. The frame includes an eccentric weight 56 in radial alignment with the hammer element 53. Additional eccentric weights such as 56' may be added to the weight 56 and secured in place by a set screw 57. The frame portion 54 is fitted between the housing 39 and reduction gear housing 42 and because of the oblong opening 55 is such that radial movement of the frame 54 may take place to bring the hammer element 53 radially closer to or radially further from the anvils 50, 51, or 52.

When the members 54 and 39 are assembled as shown in FIGURE 4 and as viewed in the cross section of FIGURE 6, it will be evident that when the hammer element 53 is in a first solid line position, it will be engaged by one of the anvils. On the other hand, when in the dotted line position, the hammer 53 is moved radially inwardly of the anvils.

The operation of the automatic tightening means of FIGURES 4, 5, and 6 will be evident from the foregoing description. The oblong opening 55 is larger in diameter than the journaling portion 40' of the housing 39 so that the hammer structure is free to rotate. By gravity, the weight 56 will thus cause the hammer element 53 and associated structure to seek a low point. This lower point is similar to the relative position shown in FIGURE 5. As the spit and thus the threaded sleeve 28 is caused to rotate, the anvil housing 39 will also be caused to rotate because of friction within the reduction gear chain extending from the last reduction spindle gear 48 keyed to the nut 31, which is in frictional threaded engagement with the threaded sleeve 28, and through the various gears to the first driving gear 40. Thus, rotation of the housing 39 will cause one of the anvils 52 to engage the hammer element 53 and thus rotate the hammer and weight structure upwardly towards the position illustrated in FIGURE 6 in the direction of the arrow 58 wherein the anvil 52 is shown lifting the hammer element 53.

As the hammer structure approaches the position shown in FIGURE 6, it will fall from the solid to the dotted line position in the direction of the arrows 59 by gravity, thereby releasing the hammer element 53 from the anvil 52 and permitting the hammer to fall downwardly. This downward movement will result in radially outward movement of the hammer element 53 to strike the next successive anvil 50, thereby through the sudden impact effecting a partial rotation of the anvil housing 39 in the direction of the arrow 60. Rotation of the housing 39 will thus take place relative to the threaded sleeve 28 and through the reduction gear chain cause a slight threaded movement of the nut structure 31 to move the same to the right as viewed in FIGURE 4 and thus cause a tightening.

The same cycle will be repeated with the next anvil so that for each complete rotation, there will be three impacts by the hammer structure and thus the nut structure will be automatically and periodically threaded to the right, thereby automatically effecting tightening. The gear reduction is such that only a slight longitudinal movement will take place for each impact sufficient to compensate for any sagging in the net structure.

The foregoing hammering action constitutes an important feature of this invention. If the longitudinal pull on a net by the hooks 33 as a consequence of the torque exerted by the eccentric weight acting through the reduction gear chain is made without hammering action, only about one-fourth the force is developed as compared to the pull resulting from the impact of the hammer. Stated differently, the impulse developed by the hammer element striking the anvil results in about four times as much torque as would result from the hammer element merely resting on the anvil with the eccentric weights extending laterally to provide a maximum torque arm.

From the foregoing description, it will be evident that the present invention has provided a novel tightening means for both enabling simple manual and automatic tightening of a rotisserie chain net.

While various specific means have been shown for coupling various ones of the elements in both structures, it will be evident to those skilled in the art that equivalent coupling arrangements may be employed without departing from the scope and spirit of the invention. The rotisserie net tightener is therefore not to be thought of as limited to the specific embodiment set forth merely for illustrative purposes.

What is claimed is:

1. A rotisserie net tightener for use with a rotating spit structure comprising, in combination: an externally threaded sleeve adapted to surround a portion of said spit structure; means for securing said sleeve to said portion of said spit structure for rotation with said spit structure, at least one longitudinal external portion of said sleeve having a flat surface; a nut structure threaded to said sleeve so that relative rotation between said nut structure and sleeve moves said nut structure longitudinally along said sleeve; a hook member for securement to one end of said net, said hook member having a central opening receiving said sleeve and including a flat portion juxtaposed said flat surface so that said hook member is locked for rotational movement with said sleeve and is free for longitudinal movement along said sleeve; and means coupling said nut structure to said hook member to cause said hook member to follow longitudinal movement of said nut structure while rotating relative to said nut structure; and actuating means responsive to rotation of said spit structure for periodically effecting relative rotation between said nut structure and threaded sleeve.

2. A tightener according to claim 1, in which said actuating means comprises: an anvil housing surrounding said nut structure and including driving gear means connecting said housing to said nut structure so that rotation of said housing causes rotation of said nut structure through said driving gear means, said housing including radially spaced anvil elements; and a gravity actuated hammer means surrounding said threaded sleeve and including a radially spaced hammer element adapted to periodically drop on one of said radially spaced anvil elements in response to rotation of said spit structure for effecting said relative rotation between said nut structure and threaded sleeve.

3. A tightener according to claim 2, in which said driving gear means comprises a chain of reduction gears, said housing having at least three of said anvil elements circumferentially spaced at one hundred twenty degrees and said hammer means comprising a frame structure having an oblong opening surrounding said threaded shaft and an eccentrically mounted weight radially spaced in alignment with said hammer element so that radial distance of said hammer element from said threaded sleeve is variable to effect engagement with one of said anvil elements to lift said hammer element and to shift radially inwardly by gravity to drop and strike the next successive anvil element.

References Cited in the file of this patent

UNITED STATES PATENTS

| | | |
|---|---|---|
| 206,751 | Small | Aug. 6, 1878 |
| 920,307 | Fisher | May 4, 1909 |
| 1,647,747 | Prokop | Nov. 1, 1927 |
| 2,368,843 | Kees | Feb. 6, 1943 |
| 2,687,268 | Hawes | Aug. 24, 1954 |